United States Patent [19]

Bartholet

[11] Patent Number: 4,527,650
[45] Date of Patent: Jul. 9, 1985

[54] WALKING MACHINE

[75] Inventor: Stephen J. Bartholet, Orange, Calif.

[73] Assignee: Odetics, Inc., Anaheim, Calif.

[21] Appl. No.: 476,629

[22] Filed: Mar. 18, 1983

[51] Int. Cl.³ ............................................. B62D 57/02
[52] U.S. Cl. .................................................... 180/8.6
[58] Field of Search ................ 180/8.6, 8.1, 8.3, 8.4, 180/8.5; 280/1.167; 305/1, 3

[56] References Cited

U.S. PATENT DOCUMENTS

| 2,827,735 | 3/1958 | Grimm | 180/8.6 |
| 3,002,578 | 10/1961 | Kraus | 180/8.6 |
| 3,255,836 | 6/1966 | Hoppmann et al. | 180/8.6 |
| 3,680,321 | 8/1972 | Bordes | 180/8.6 X |
| 4,202,423 | 5/1980 | Soto | 180/8.6 |

FOREIGN PATENT DOCUMENTS 952584  3/1964  United Kingdom ................ 180/8.6

OTHER PUBLICATIONS

"The Basic Motion Regulation System for a Quadruped Walking Vehicle", by S. Hirose et al., presented at the Design Engineering Technical Conference, Sep. 28–Oct. 1, 1980.
"Machines That Walk", by Marc H. Raibert et al., Scientific American, Jan. 1983, pp. 44–53.
"Ohio State Engineers Build Walking Machine", by Karen Kienle, The Ohio State Engineer, Nov. 1981, p. 6.

Primary Examiner—John A. Pekar
Attorney, Agent, or Firm—Spensley Horn Jubas & Lubitz

[57] ABSTRACT

A walking machine comprising a body, six leg frames mounted on the body for pivotal movement about six parallel, spaced axes, the axes being located at the vertices of a hexagon, each of the leg frames being mounted for pivotal movement through an angle greater than 120°, a leg mechanism mounted on each of the leg frames, each leg mechanism including a foot, a drive mounted on the body for controlling the pivotal movement of each of the leg frames, a drive mounted on each of the leg frames for controlling movement of each foot in a direction parallel to the axes, and a drive mounted on each of the leg frames for controlling the movement of each foot in a radial direction.

9 Claims, 7 Drawing Figures

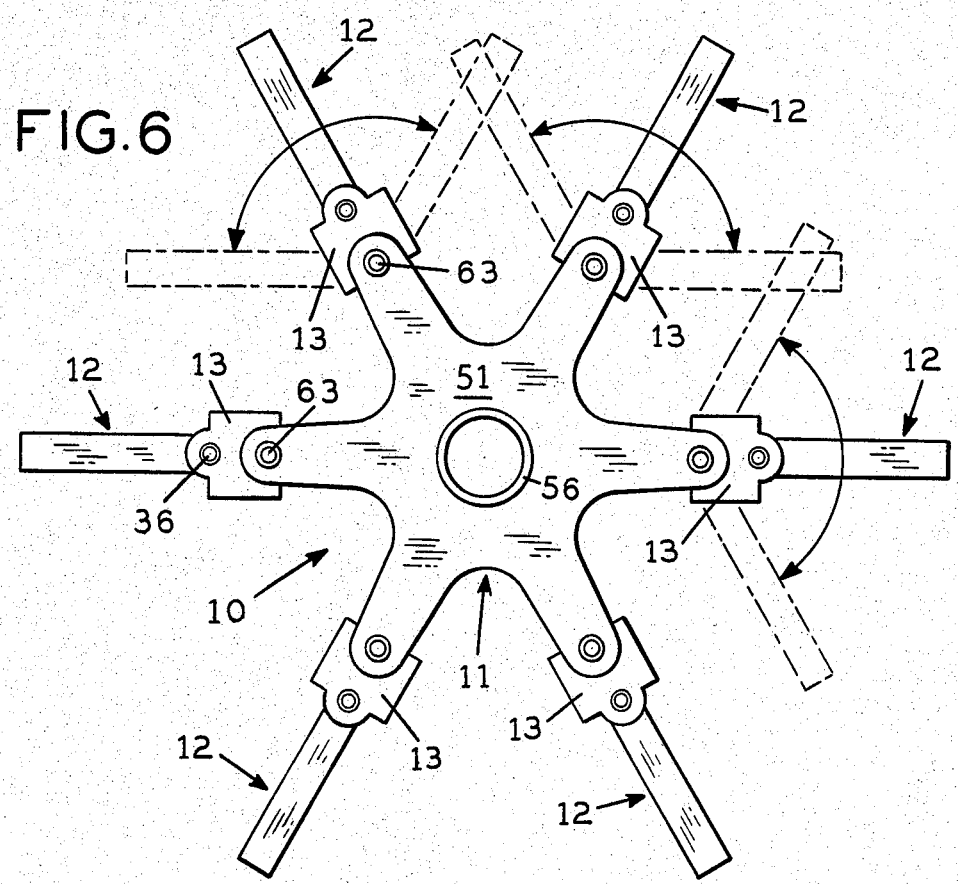
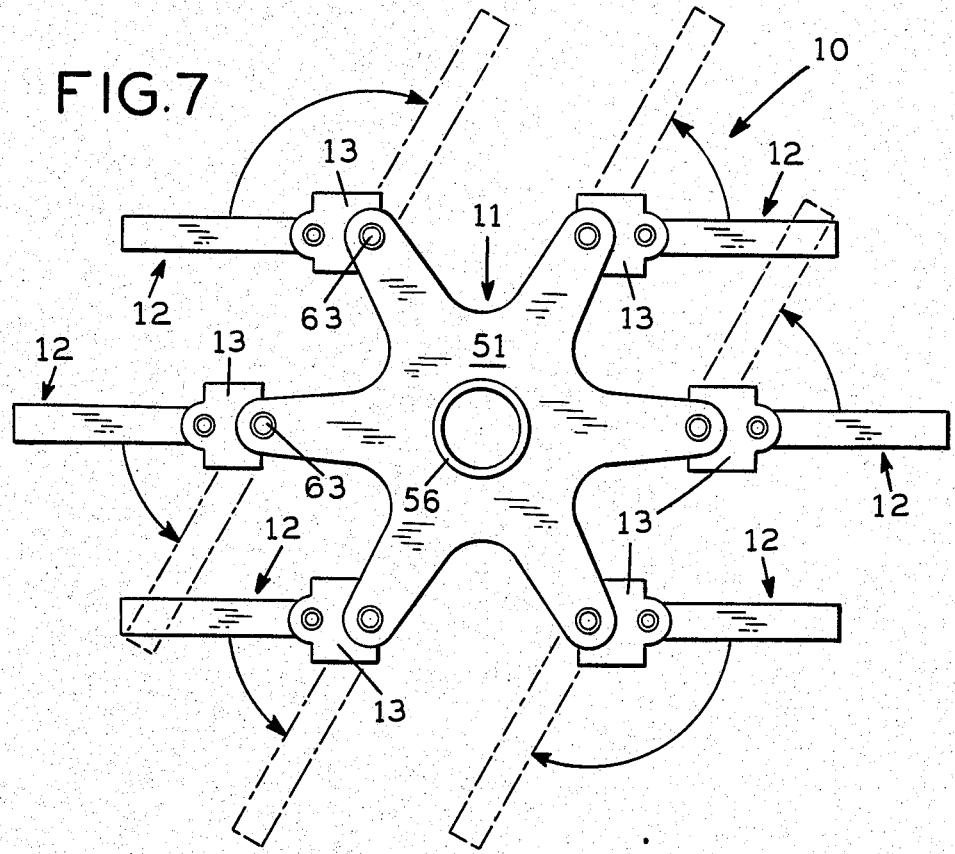

WALKING MACHINE

BACKGROUND OF THE INVENTION

1. Field of the Invention

The present invention relates to a walking machine and, more particularly, to a walking machine having a very narrow profile which can walk and maneuver in very confined areas.

2. Description of the Prior Art

It has long been known that it would be advantageous to develop a machine that walks rather than one driven by wheels or treads because a machine with legs can operate in areas and on terrain where wheeled or treaded vehicles cannot go. Knowing this, numerous attempts have been made over the years to develop a walking machine. However, the problems in developing such a machine have been so formidable that to this time, no satisfactory machine exists. These problems include coordinating the movement of the various legs, teaching the machine how to sense its environment so that each foot lands properly, and teaching the machine balance so that it does not fall over. The simple fact of the matter is that while walking is second nature to people and animals, it is extremely complex for computers and robots.

The computer, with its ability to process enormous amounts of data and actuate suitable commands, promises to make the control of the legs of a walking machine a manageable problem. As a result, a number of researchers around the world have been working on the development of various different types of walking machines.

Most walking machines that have been proposed heretofore are very large, bulky and cumbersome objects. This highly limits their usefulness. It would be highly desirable to have a walking machine which could be able to walk and maneuver in very confined areas, such as down narrow hallways and through doors. This has not been achieved heretofore.

Most walking machines proposed heretofore have a defined front, rear and sides. Thus, the machine has different operating characteristics depending on its orientation. Therefore, if the walking machine is moving in one direction and needs to change direction, it is necessary for it to turn around. This is often very difficult when working in confined areas. Thus, it would be highly desirable to provide a walking machine which has omnidirectionality in the sense that it can walk in any direction with the same efficiency as in any other direction. With such a capability, a machine can walk down a narrow hallway with the body oriented in a given direction and then simply move in another direction down another hallway without the necessity o the body rotating. Again, such has been unattainable heretofore.

In copending application Ser. No. 476,558 now U.S. Pat. No. 4,511,011 filed concurrently herewith, entitled Leg Mechanism for Walking Machine, and assigned to Odetics, Inc. the assignee of the present application, there is disclosed a leg mechanism for a walking machine including a plurality of links arranged in a pantograph mechanism, which links are able to fold past each other so that the legs can tuck in close to the body, permitting a machine to which such legs are attached to have a small profile so that it can maneuver in areas that are as small as a human being can maneuver in.

In copending application Ser. No. 476,583, now U.S. Pat. No. 4,502,566 filed concurrently herewith, entitled Vertical Actuator Mechanism for the Legs of a Walking Machine, and assigned to Odetics, Inc., the assignee of the present application, there is further disclosed the basic details of forming a leg mechanism from a pantograph so as to achieve isolation between the mechanisms which drive the machine foot horizontally and vertically. That application also teaches the broad concept of an actuator mechanism for driving the foot vertically. The vertical actuator mechanism maintains the vertical position of the foot as the foot is driven horizontally.

In copending application Ser. No. 476,566 now U.S. Pat. No. 4,503,924 filed concurrently herewith, entitled Horizontal Actuator Mechanism for the Legs of a Walking Machine, and assigned to Odetics, Inc., the assignee of the present application, there is disclosed a horizontal actuator mechanism for the pantograph leg mechanism of a walking machine which allows small, fast motors to be used in applying the horizontal actuation force.

Upon review of these applications, the problem remains to attach the leg mechanisms to a machine body to overcome the problems discussed hereinabove. This is the primary objective of the present invention.

SUMMARY OF THE INVENTION

According to the present invention, there is provided a walking machine which achieves the desired omnidirectionality. the present walking machine can orient the legs thereof in such a manner that it has a very narrow profile so that it can maneuver in a space where walking machines previously could not go, such as down a narrow hallway or through a door. Furthermore, the present walking machine can function with equal efficiency in any direction so that if the walking machine is moving in one direction and it comes to a corner, it can move off at 90° in another direction without having to rotate its body in order to steer around the corner. The present walking machine has no specific front, back or sides, being a completely symmetrical vehicle from a mechanical standpoint.

Briefly, a walking machine constructed in accordance with the teachings of the present invention comprises a body, six leg frames mounted on the body for pivotal movement about six parallel, spaced axes, the axes being located at the vertices of a hexagon, each of the leg frames being mounted for pivotal movement through an angle greater than 120°, a leg mechanism mounted on each of the leg frames, each leg mechanism including a foot, drive means mounted on the body for controlling the pivotal movement of each of the leg frames, drive means mounted on each of the leg frames for controlling movement of each foot in a direction parallel to the axes, and drive means mounted on each of the leg frames for controlling the movement of each foot in a radial direction.

OBJECTS, FEATURES AND ADVANTAGES

It is therefore the object of the present invention to solve the problems associated with providing a walking machine which can walk and maneuver in very confined areas. It is a feature of the present invention to solve these problems by providing a walking machine in which six pivotal legs are located at the vertices of a hexagon, with each leg being pivotable through an angle greater than 120°. An advantage to be derived is an omnidirectional walking machine. Another advantage is a walking machine which can walk and maneuver in very confined areas. Still another advantage is a walking machine which can change its direction of movement without rotating its body.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIGS. 6 and 7 are highly simplified top plan views useful in explaining the maneuverability of the leg machanisms of the present walking machine.

DESCRIPTION OF THE PREFERRED EMBODIMENT

Figure 1:
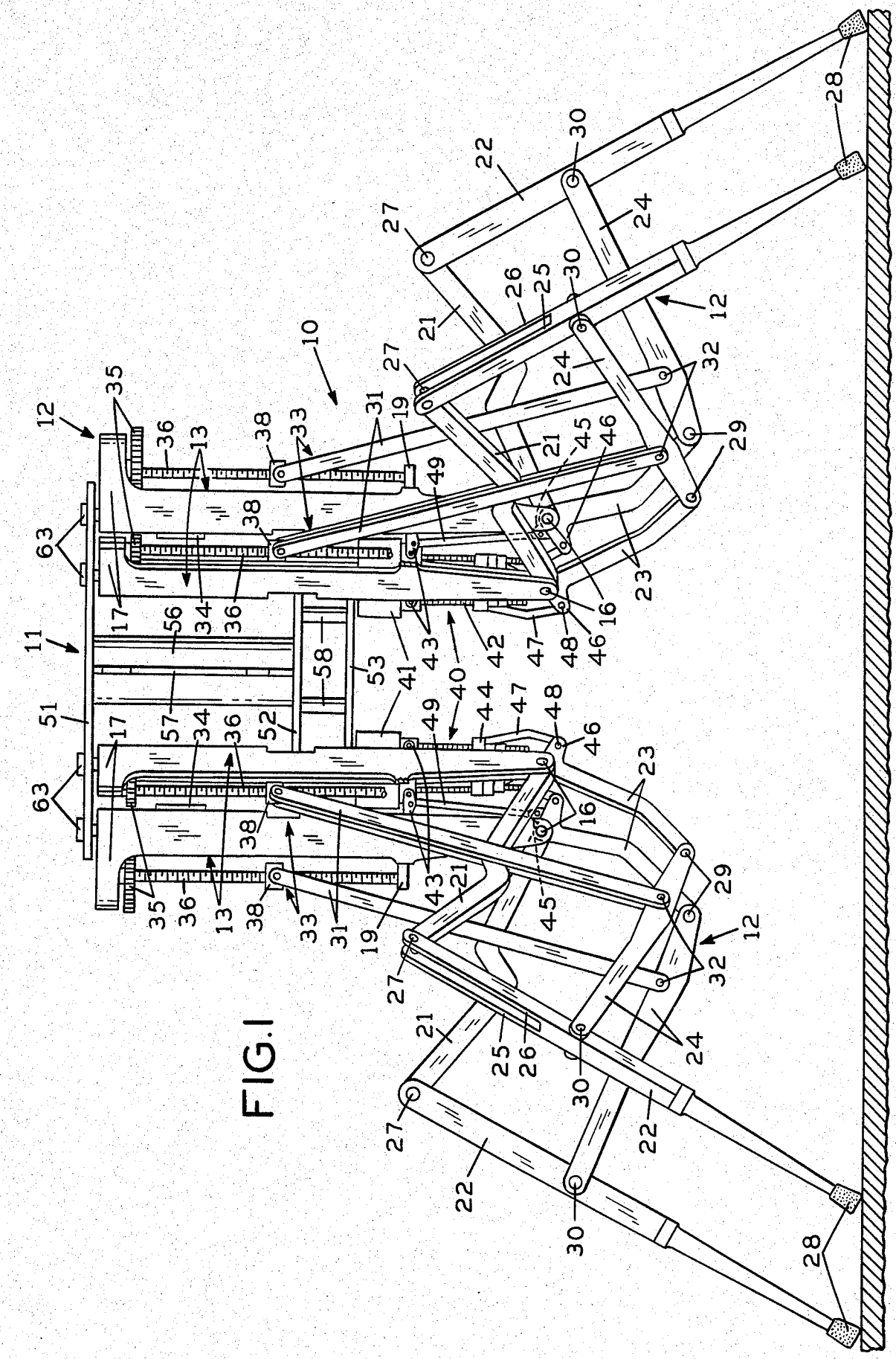
FIG. 1 is a front elevation view of a walking machine constructed in accordance with the teachings of the present invention.

Referring now to the drawings and, more particularly, to FIGS. 1-4 thereof, there is shown a walking machine, generally designated 10, including a body, generally designated 11, and six identical leg mechanisms, generally designated 12. Reference should be had to the before-mentioned copending application Ser. No. 476,558 for a complete description of leg mechanism 12 and the manner in which it will allow the legs of walking machine 10 to fold compactly against body 11. Reference should also be had to the before-mentioned copending application Ser. No. 476,583 for a description of a vertical actuator mechanism for leg mechanism 12. Reference should also be had to the before-mentioned copending application Ser. No. 476,566 for a description of a horizointal actuator mechanism for leg mechanism 12.

The construction of each of leg mechanisms 12 is not directly relevant to the present invention, the present invention being directed to the manner in which leg mechanisms 12 may be combined and attached to body 11 for forming a complete walking machine. However, the present invention does include the leg mechanisms and horizontal and vertical actuators therefor described in the before-mentioned copending applications. Accordingly, leg mechanisms 12 will be described briefly. Furthermore, since each of leg mechanisms 12 is identical, a description of one will suffice to describe all.

Each leg mechanism 12 includes an elongate, upright leg frame 13 which is adapted to be connected to body 11 in a manner which will permit pivotal movement of leg frame 13 about a vertical axis. Leg frame 13 has a pair of opposed, spaced, parallel sides 14 and 15. A pin 16 extends between sides 14 and 15, at the lower end of leg frame 13. Also extending between sides 14 and 15 are a plurality of cross members which perform supporting functions. A first plate 17 extends across the top of each leg frame 13, between sides 14 and 15. A second plate 18, extends between sides 14 and 15, intermediate the upper and lower ends thereof. A bearing support plate 19 also extends between sides 14 and 15, for reasons which will appear more fully hereinafter. Other support plates (not shown) may also be included.

Each leg mechanism 12 includes a plurality of elongate links arranged in a parallelogram to form a pantograph mechanism whereby forces applied at selected points on individual ones of the links can be transmitted to another link which forms the movable foot of the mechanism. Each of the links will be described as a single link but may be multiple, side-by-side, parallel links as described more fully in copending application Ser. No. PD-6594.

More specifically, each leg mechanism 12 includes a first elongate link 21 which may be viewed as forming the thigh of leg mechanism 12. Pin 16 extends through a first end of link 21 so as to pivotally connect link 21 to leg frame 13.

Each leg mechanism 12 includes a second elongate link 22 which forms the shin of leg mechanism 12. Link 22 is a generally U-shaped member in that the upper portion thereof includes a pair of opposed, parallel sides 25 and 26 and the lower portion is a solid member. First ends of sides 25 and 26 and the second end of link 21 are pivotally connected to each other by means of a pin 27. The lower end of link 22 forms the foot 28 of leg mechanism 12, which foot 28 may conveniently be provided with a rubber cap.

Each leg mechanism 12 also includes a third link 23, a first end of link 23 being pivotally connected to leg frame 13, preferably by means of pin 16.

The fourth side of each parallelogram is formed by an elongate link 24, a first end of which is pivotally connected to the second end of link 23 by means of a pin 29. The second end of link 24 is pivotally connected to an intermediate point on link 22 by means of a pin 30.

It will be readily appreciated by those skilled in the art, from an inspection of FIG. 1, that the arrangement of the links just described forms a pantograph mechanism, with links 21-24 formed into a parallelogram, the corners of which are defined by pins 16, 27, 29 and 30. Pin 16 is the fixed point on the pantograph, whereas foot 28 is the ultimate movable member thereof.

Vertical movement of foot 28 is controlled by a pair of actuator struts 31, first ends of struts 31 being pivotally connected to an intermediate point on link 24 by means of a pin 32. The second ends of struts 31 are connected to a leg actuator mechanism, generally designated 33, which is connected to leg frame 13.

Figure 3:
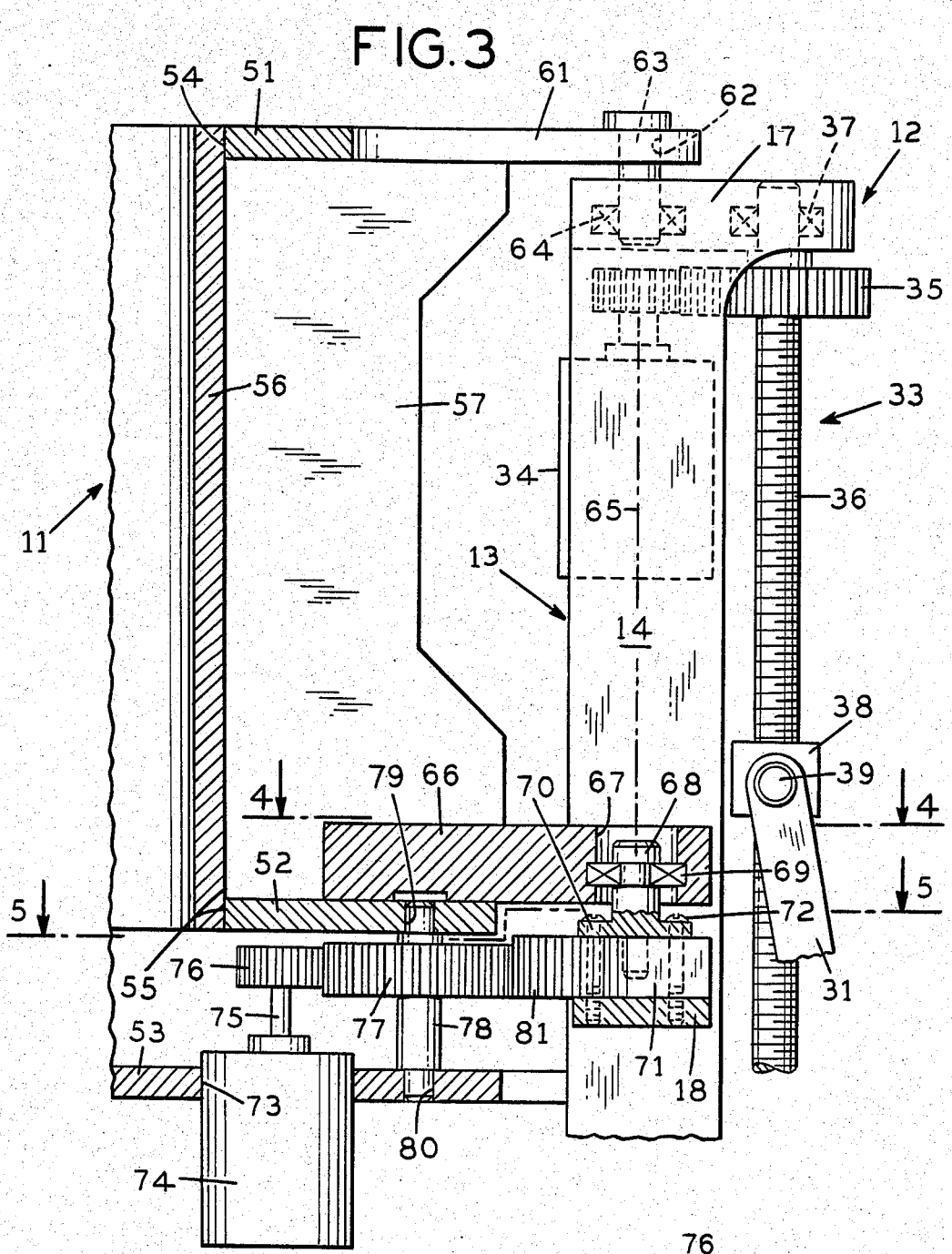
FIG. 3 is an enlarged sectional view taken along the line 3—3 in FIG. 2.

More specifically, leg actuator mechanism 33 includes a motor 34 connected by means of suitable gearing 35 to a lead screw 36 which is mounted for rotation in leg frame 13 by a pair of bearings 37. One bearing 37 is mounted in plate 17, as shown in FIG. 3, and the other bearing is mounted in bearing support plate 19. A drive nut 38 is mounted on lead screw 36 so that drive nut 38 is driven vertically, either up or down, by rotation of lead screw 36. The second ends of struts 31 are pivotally connected to drive nut 38 by means of pins 39. For a more complete description of the manner in which leg actuator mechanism 33 controls the vertical movement of foot 28, reference should be had to copending application Ser. No. 476,583.

The radial movement of foot 28 is controlled by a leg actuator mechanism, generally designated 40, which is shown in FIG. 1. Leg actuator mechanism 40 includes a motor 41 which directly drives a lead screw 42. Motor 41 is pivotally mounted on one end of a rocker arm 43, the other end of rocker arm 43 being connected between sides 14 and 15 of leg frame 13. Riding on lead screw 42 is a drive nut 44.

Each link 21 incorporates a crank arm 45 made as an integral part thereof, extending approximately perpendicular to the first end thereof, adjacent pin 16. Similarly, link 23 incorporates a crank arm 46 made as an integral part thereof, extending approximately perpendicular to the first end thereof, adjacent pin 16. A link 47 has a first end thereof made integral with drive nut 44 and a second end thereof connected to crank arm 46 by means of a pin 48. A link 49 has a first end thereof connected to rocker arm 43 and a second end thereof connected to crank arm 45. For a more complete description of the manner in which leg actuator mechanism 40 controls the radial movement of foot 28, reference should be had to copending application Ser. No. 476,566.

Still referring to FIGS. 1-4, body 11 includes three main support plates 51, 52 and 53. Plate 51 is the top plate, plate 53 is the bottom plate and plate 52 is an intermediate plate. These plates are held in parallel, spaced, coaxial relationship relative to each other by a combination of means. Plates 51 and 52 have central holes 54 and 55, respectively, therein and a tube 56 extends between plates 51 and 52, perpendicular thereto, tube 56 extending into holes 54 and 55. The opposite ends of tube 56 are preferably welded to plates 51 and 52. In addition, a plurality of additional support plates 57 extend between plates 51 and 52, plates 57 extending radially outwardly from tube 56. A plurality of spacers 58 extend between plates 52 and 53. All of these parts are preferably welded or bolted together.

Figure 2:
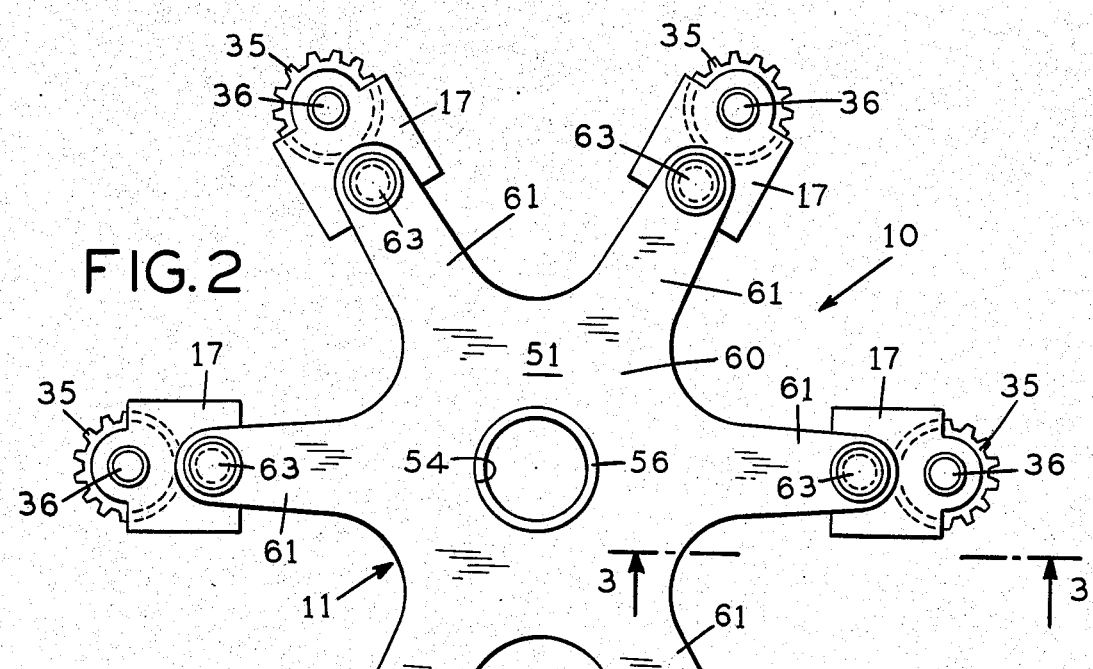
FIG. 2 is a top plan view thereof.

It is the teaching of the present invention to mount leg frames 13 on body 11 for pivotal movement about six parallel, spaced axes, the axes being located at the vertices of a hexagon. Thus, as shown in FIG. 2, plate 51 includes a central portion 60, to which tube 56 is attached, and six radially outwardly extending arms 61, arms 61 being spaced at 60° intervals around central portion 60. Each arm 61 has a hole 62 extending laterally therethrough through which a shaft 63 extends, shaft 63 extending into a bearing 64 in top plate 17 of leg frame 13. Thus, shafts 63 and bearings 64 support the upper ends of leg frames 13 for pivotal movement about axes 65 which are coaxial with shafts 63.

Figure 4:
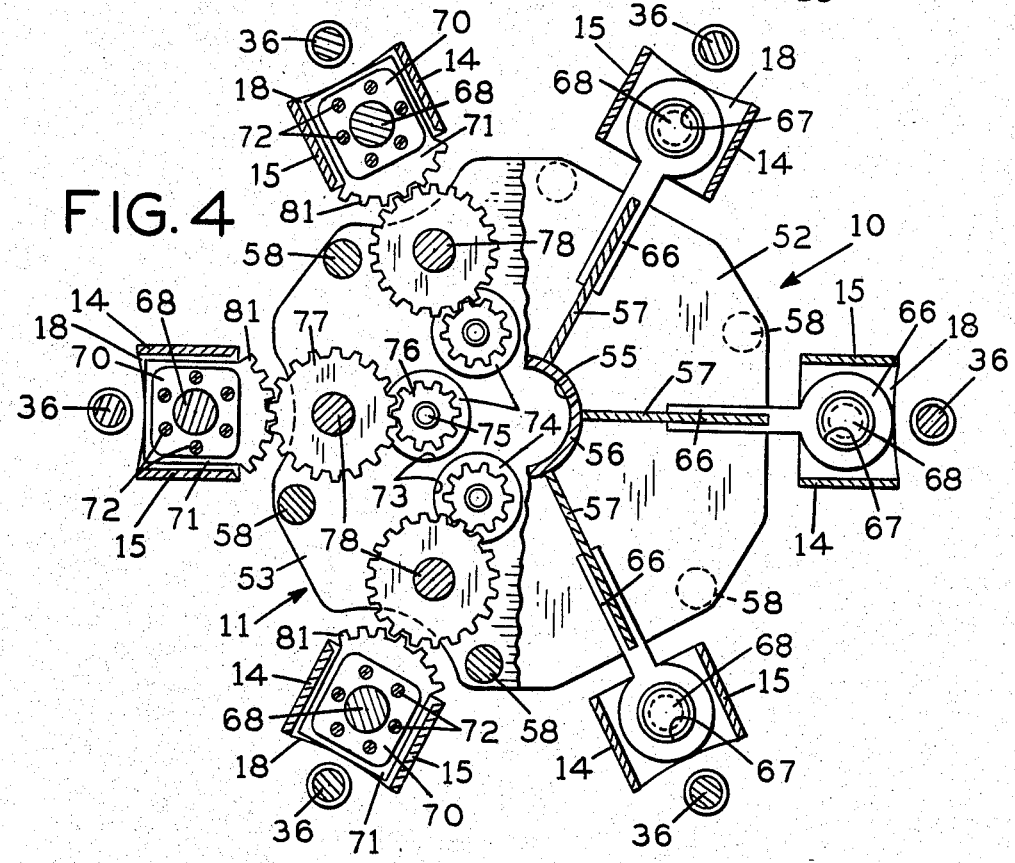
FIG. 4 is a sectional view taken through the body of the walking machine, the right-hand portion of FIG. 4 being taken along the line 4—4 in FIG. 3 and the left-hand portion thereof being taken along the line 5—5 in FIG. 3.

As seen on the right side of FIG. 4, plate 52 is a generally disc-shaped member which has connected to the upper surface thereof a plurality of bearing support plates 66 which extend radially outwardly therefrom. Each support plate 66 has a hole 67 into which a shaft 68 extends. A bearing 69 is positioned within hole 67 and supports shaft 68 for pivotal movement about axis 65. The lower end of shaft 68 includes a flange 70 which rests on another plate 71. Plate 71 rests on plate 18, described previously, which is connected to and extends between sides 14 and 15 of leg frame 13. A plurality of screws 72 extend through flange 70 and plate 71 into plate 18 to rigidly interconnect these members. In this manner shaft 68 is rigidly connected to leg frame 13 and bearing 69 supports shaft 68 and leg frame 13 for pivotal movement around axis 65.

Plate 53 is a disc-shaped member, generally similar to plate 52, being spaced immediately therebelow. Plate 53 has a first plurality of holes 73 therein for receipt of motors 74. Motors 74 are spaced around the central axis of plate 53, at 60° intervals. Each motor 74 has an output shaft 75 which supports a gear 76. An idler gear 77 is mouned on a shaft 78, the opposite ends of which extend through coaxial holes 79 and 80 in plates 52 and 53, respectively. Gear 77 engages gear 76. The radially inward side of plate 71 is formed with gear teeth 81 which engage idler gear 77. In this manner, activation of motor 74 drives gear teeth 81 to cause pivotal movement of plate 71 and leg frame 13.

Figure 5:
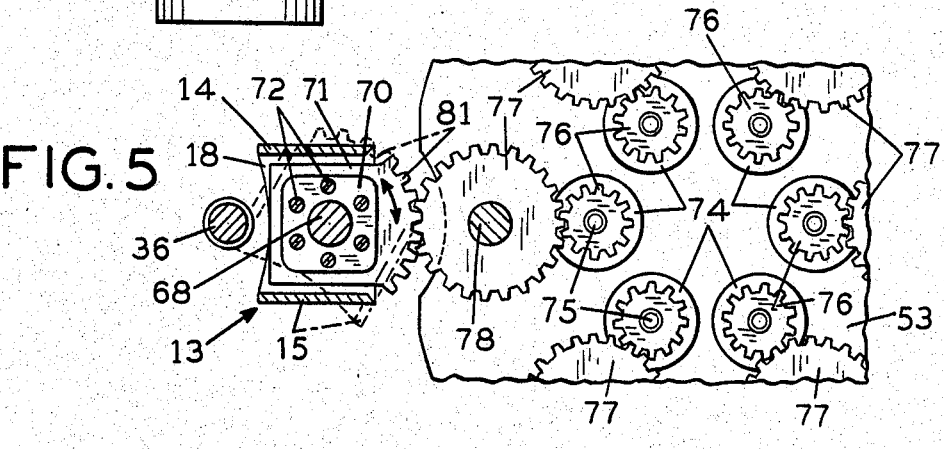
FIG. 5 is a sectional view taken along the line 5—5 in FIG. 3 and showing the pivotal movement of one of the leg mechanisms.

In operation, FIG. 5 shows the manner in which operation of the individual motors 74 causes pivotal movement of its associated leg frame 13 about its associated axis 65. According to the preferred embodiment of the present invention, each leg frame 13 can be pivoted through an angle of ±65° from its central position, as shown in FIGS. 2 and 4 and as shown in solid lines in FIG. 5. The advantage of such an arrangement can be seen in FIGS. 6 and 7. That is, FIG. 6 shows each of leg mechanisms 12 in solid lines in its central position. The extreme positions of several of the leg mechanisms is shown in dotted lines. It is seen that in their extreme positions, one leg mechanism 12 overlaps the area of anoher leg mechanism 12. This is highly important so that a walking machine can achieve the desired omnidirectionality and so that the machine can orient the legs thereof in such a manner that it has a very narrow profile so that it can maneuver in a space where walking machines previously could not go, such as down a narrow hallway or through a door.

Referring now to FIG. 7, a first position of the individual leg mechanisms 12 of walking machine 10 is shown in solid lines. It is there seen that three of leg mechanisms 12 can be faced in one direction with the remaining three leg mechanisms facing in the opposite direction so as to provide walking machine 10 with a very narrow profile in a direction perpendicular to the direction in which leg mechanisms 12 are facing. Assume walking machine 10 now wants to change direction. FIG. 7 shows the manner in which the individual leg mechanisms 12 can be rotated to a new position and walking machine 10 can now begin to walk in the new direction, with the same efficiency as it was previously moving, without rotating body 11. It is clear from an inspection of FIG. 7 that walking machine 10 has no specific front, back or sides, being a completely symmetrical vehicle from a mechanical standpoint.

Except when leg mechanisms 12 of walking machine 10 are oriented as shown in FIG. 7, providing walking machine 10 with the narrowest of profiles, walking machine 10 has complete omnidirectionality where there is no need at all for any one of the legs to be pointed in the direction of motion or in any other direction. For example, with the legs as shown in FIG. 6, walking machine 10 can move just as efficiently in any direction.

On the other hand, when walking machine 10 positions leg mechanisms 12 into the narrow stance shown in FIG. 7 so that it may pass through very narrow doorways or walk down very narrow hallways, it does become important to have a particular leg, any one of the six legs, go very closely in the direction of motion. The reason for this is that the swing axis of each leg mechanism 12 has a mechanical range of ±65° from its straight out position. Since leg mechanisms 12 are mounted 60° apart, if three legs are to extend straight ahead, in the direction of motion and the other three legs extend straight to the rear, the two legs on the opposite sides of the leading leg will have to be rotated 60° from their normal straight out positions and this will take them almost to their mechanical limits. Because the outer two legs will be operating near their mechanical swing limits, this will require the center leg to operate within ±5° of the direction of motion. Thus, the very narrow stance does require that one of the six legs move almost exactly within a few degrees of the direction of motion. On the other hand, for any wider stance, there is complete omnidirectionality.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A walking machine comprising:
   a body;
   six leg mechanisms coupled to the body and pivotal about six parallel spaced axes, said axes being located at the vertices of a hexagon, each leg mechanism extending beyond the body in a plane parallel to its respective axis, wherein the leg mechanisms can be pivoted so that they extend radially from the center of the hexagon for maximum stability of the walking machine and pivoted so that at least some of the leg mechanisms extend non-radially with respect to the center of the hexagon to provide a reduced profile for the walking machine.

2. A walking machine according to claim 1 wherein each leg mechanism includes a leg frame pivotally mounted to the body further comprising:
   means mounted on said body for controlling the pivotal movement of each of said leg frames.

3. A walking machine according to claim 2, wherein each of said leg mechanisms includes a foot and further comprising:
   means mounted on each of said leg frames for controlling the movement of said foot in a direction parallel to said axes.

4. A walking machine according to claim 3, further comprising:
   means mounted on each of said leg frames for controlling the movement of said foot in a radial direction relative to the axis of its respective leg mechanism.

5. A walking machine according to claim 1, wherein each of said leg frames is mounted for pivotal movement through an angle of at last 120°.

6. A walking machine according to claim 1, wherein each of said leg frames is mounted for pivotal movement through an angle greater than 120°.

7. A walking machine according to claim 1, wherein each of said leg mechanisms includes a foot and further comprising:
   means mounted on each of said leg frames for controlling the movement of said foot in a direction parallel to said axes.

8. A walking machine according to claim 7, further comprising:
   means mounted on each of said leg frames for controlling the movement of said foot in a radial direction relative to the axis of the respective leg mechanism.

9. A walking machine according to claim 1, wherein each of said leg mechanisms includes a foot and a leg frame privotally mounted to the body and further comprising:
   means mounted on each of said leg frames for controlling the movement of said foot in a radial direction relative to the axis of its respective leg mechanism.

* * * * *